US012266870B2

(12) United States Patent
Thiam et al.

(10) Patent No.: US 12,266,870 B2
(45) Date of Patent: Apr. 1, 2025

(54) STACKED PATCH ANTENNA

(71) Applicant: Molex, LLC, Lisle, IL (US)

(72) Inventors: Cheikh Thiam, Grand Blanc, MI (US); Ahmad M. Yacoub, Grand Blanc, MI (US); Mohamed O. H. Khalifa, Troy, MI (US); Mohammad Alrefai, Grand Blanc, MI (US)

(73) Assignee: Molex, LLC, Lisle, IL (US)

( * ) Notice: Subject to any disclaimer, the term of this patent is extended or adjusted under 35 U.S.C. 154(b) by 182 days.

(21) Appl. No.: 17/910,856

(22) PCT Filed: Mar. 11, 2021

(86) PCT No.: PCT/IB2021/052019
§ 371 (c)(1),
(2) Date: Sep. 12, 2022

(87) PCT Pub. No.: WO2021/181318
PCT Pub. Date: Sep. 16, 2021

(65) Prior Publication Data

US 2023/0097868 A1 Mar. 30, 2023

Related U.S. Application Data

(60) Provisional application No. 62/988,623, filed on Mar. 12, 2020.

(51) Int. Cl.
*H01Q 9/04* (2006.01)

(52) U.S. Cl.
CPC .................................. *H01Q 9/0414* (2013.01)

(58) Field of Classification Search
CPC ............................ H01Q 9/0414; H01Q 9/0471
See application file for complete search history.

(56) References Cited

U.S. PATENT DOCUMENTS

2011/0012788 A1 1/2011 Rowell et al.
2011/0025574 A1* 2/2011 Tiezzi .................. H01Q 9/0457 343/824
2011/0080323 A1* 4/2011 Thiam ..................... H01Q 5/371 343/700 MS
2019/0020110 A1* 1/2019 Paulotto ................. H01Q 5/392
2019/0267697 A1* 8/2019 Quinlan .................... H01Q 1/36
2019/0302271 A1 10/2019 Panther et al.
2020/0235481 A1* 7/2020 Carceller .............. H01P 1/2088
2020/0303821 A1* 9/2020 Lee ......................... H01Q 5/335
2020/0388924 A1* 12/2020 Lee ......................... H01Q 21/08

FOREIGN PATENT DOCUMENTS

WO 9959223 A2 11/1999

OTHER PUBLICATIONS

International Preliminary Report on Patentability received for PCT Application No. PCT/IB2021/052019, mailed on Sep. 22, 2022, 09 Pages.
International Search Report and Written Opinion received for PCT Application No. PCT/IB2021/052019, mailed on May 31, 2021, 10 Pages.

* cited by examiner

*Primary Examiner* — Awat M Salih

(57) ABSTRACT

A stacked patch antenna is disclosed that provides desirable performance in a cost effective and space efficient manner. A frame system is used to support a first patch and a second patch and a director plate that can be positioned between the first patch and the second patch. The design of the system allows for the first patch and the second patch to have a lower effective dielectric constant.

20 Claims, 14 Drawing Sheets

STACKED PATCH ANTENNA

RELATED APPLICATIONS

This application is a national phase of PCT/IB2021/052019, filed on Mar. 11, 2021, which claims priority to U.S. Provisional Application 62/988,623, filed Mar. 12, 2020, all of which are incorporated herein by reference in their entireties.

TECHNICAL FIELD

This disclosure relates to the field of antennas, more specifically to field of stacked patch antennas.

DESCRIPTION OF RELATED ART

Patch antennas are known in the RF field as being an effective antenna design if a low profile is desired. In general, a patch antenna consists of the arrangement of flat metal (the "patch") mounted over dielectric substrate that is mounted over another sheet of metal that acts as a ground plane. Because of size requirements, patch antennas are primarily used in microwave frequencies.

Stacked patch antennas are also known to provide useful functionality. A stacked patch antenna is essentially two patch antennas stacked on top of each other and can provide effective bandwidth for two different frequencies while providing a relatively low profile. One issue with existing stacked patch antennas is that they tend to be expensive and can suffer from more loss than might be desirable. As a result, further improvements to a stacked patch antenna design would be appreciated by certain individuals.

SUMMARY

A stacked patch antenna is disclosed that includes a top patch and a bottom patch, both of which are supported. The top patch can be supported by a first frame and the bottom patch can be supported by a second frame, which collectively define a frame system and the frame system can be one, two or more pieces. The top patch includes a first top surface and one or more arms that are folded under the first top surface. The bottom patch includes a second top surface and one or more arms that folded under the second top surface. Both the top and bottom patch can include connecting leads that allow the respective radiating elements to be connected to a circuit board. A director plate can be placed between the top patch and the bottom patch to help reflect energy to the top patch and guide the energy of the bottom patch. A director plate can also be placed above the top patch.

BRIEF DESCRIPTION OF THE DRAWINGS

The present application is illustrated by way of example and not limited in the accompanying figures in which like reference numerals indicate similar elements and in which.

DETAILED DESCRIPTION

The detailed description that follows describes exemplary embodiments and the features disclosed are not intended to be limited to the expressly disclosed combination(s). Therefore, unless otherwise noted, features disclosed herein may be combined together to form additional combinations that were not otherwise shown for purposes of brevity. Furthermore, certain features are optional and may be omitted without departing from the scope of the disclosure.

Figure 14:
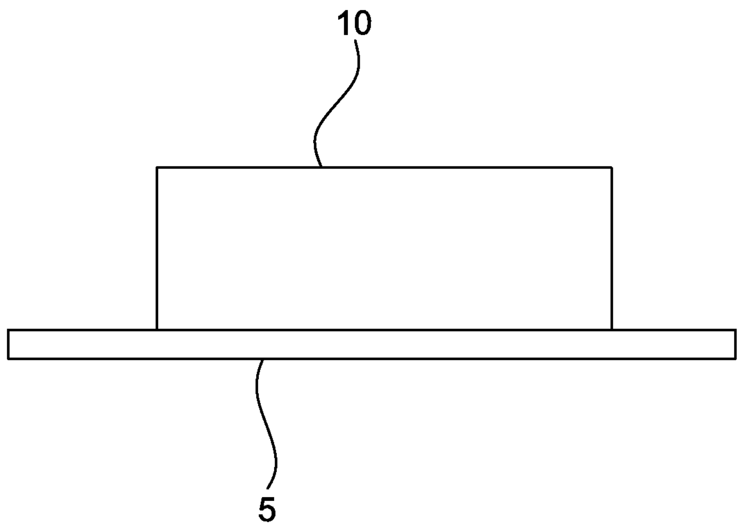
FIG. 14 illustrates a schematic representation of an antenna system mounted on a substrate.

Looking first a FIG. 14, in a typical embodiment a stacked patch antenna system 10 is mounted on a substrate 5. The substrate 5 can be any desirable substrate construction, such as but without limitation, a conventional PCB, a plastic body or ceramic-based body. The stacked patch antenna system 10 will be discussed below.

Figure 6:
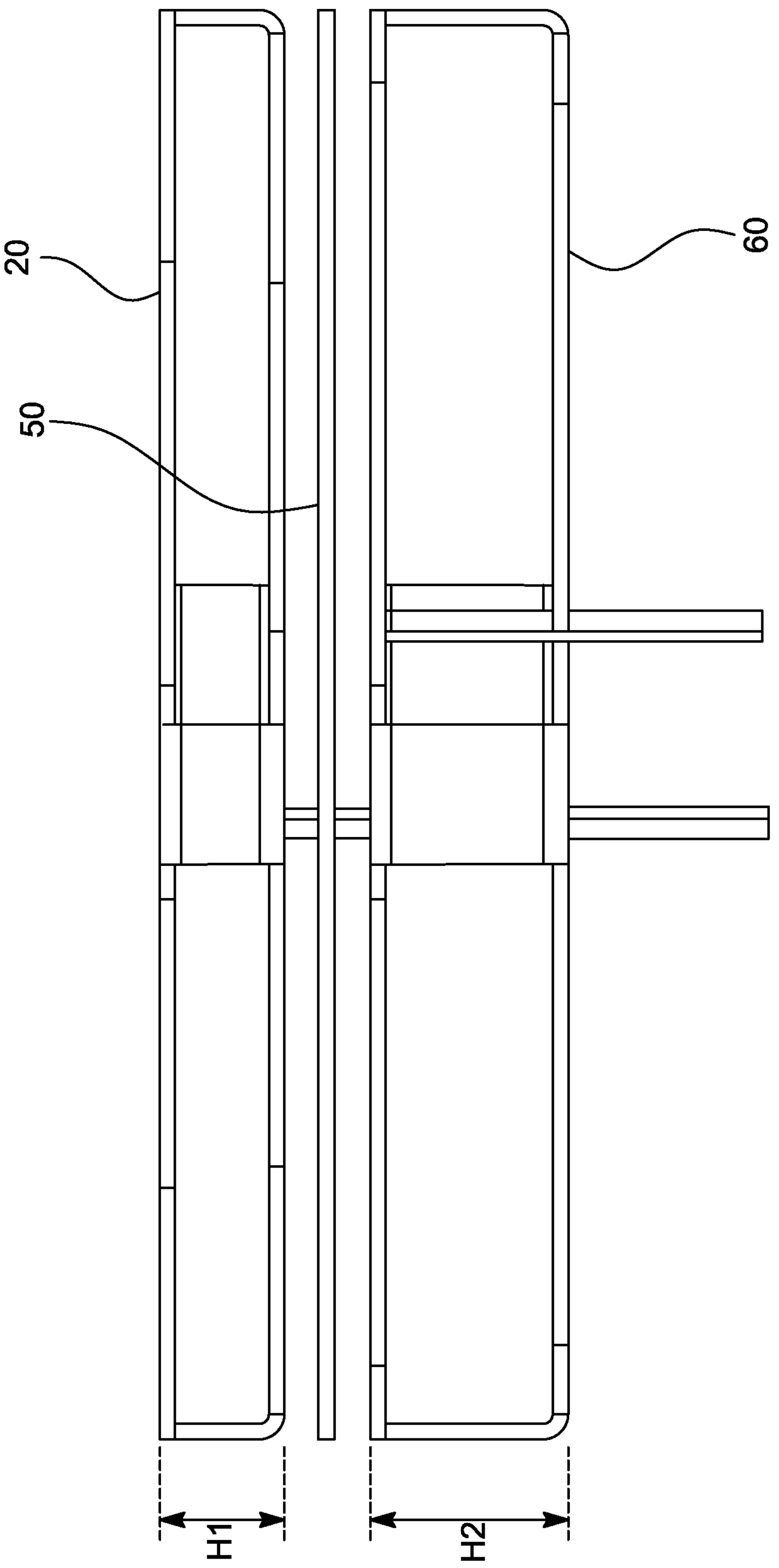
FIG. 6 illustrates a simplified side view of the embodiment depicted in FIG. 4 with the housing omitted.
Figure 7:
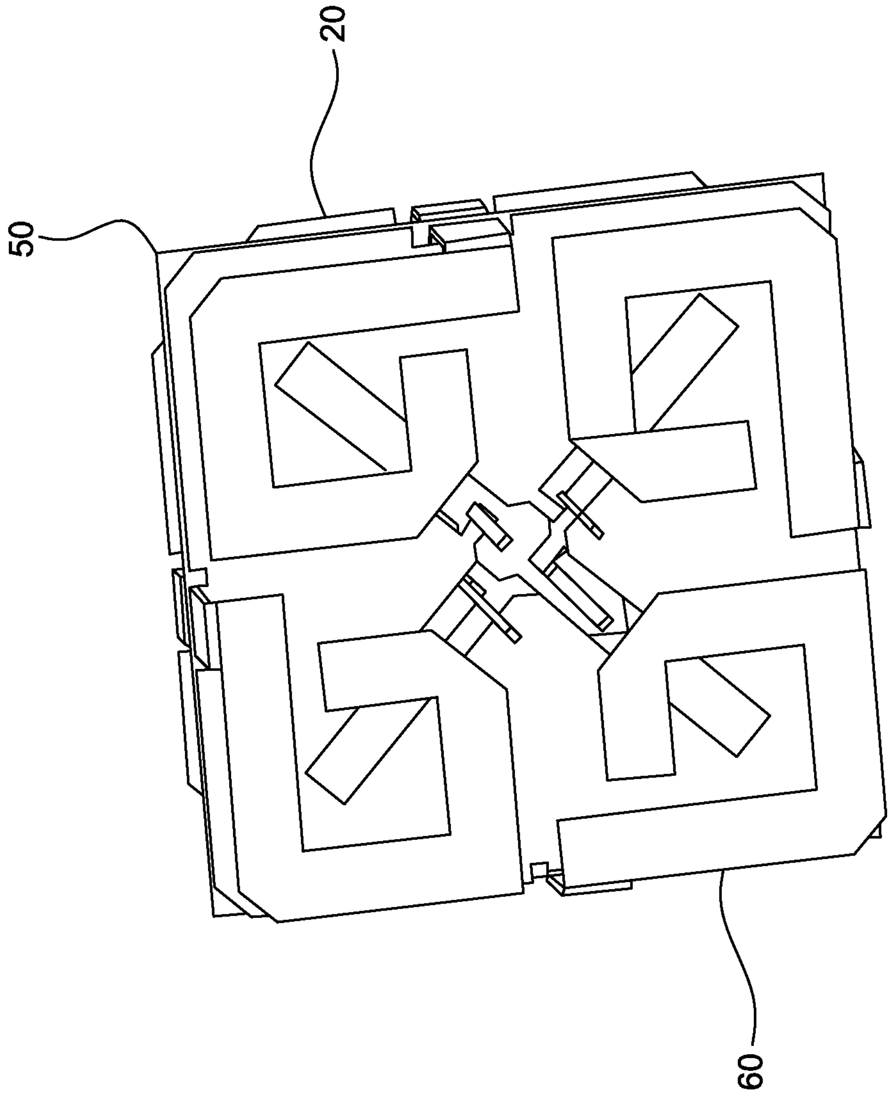
FIG. 7 illustrates a perspective view of embodiment depicted in FIG. 6, taken from an bottom side.

As can be appreciated from FIGS. 1-7, a stacked patch antenna 10 includes a frame system 15 that support a first patch 20 that is positioned above a second patch 60. The frame system 15 includes a frame 40 that supports the first patch 20 and a frame 80 that supports the second patch 60. Positioned between the first patch 20 and the second patch 60 is a director plate 50 that will be discussed further below. This can be better appreciated from FIG. 6, which illustrates the basic geometric arrangement of the first patch 20, the second patch 60 and a director plate 50 between the first patch 20 and the second patch 60 while omitting the frame system. The relative spacing of these elements can be modified but in a preferred embodiment (as depicted in FIG. 6) the director plate can be positioned approximately equidistant between the first patch 20 and the second patch 60. It should be noted that while H1 is depicted as being substantially less than H2, which is beneficial for certain tuning applications, other configurations are possible depending on the desired tuning and the size of the second patch 60 versus the first patch 20.

The depicted design has the director plate 50 isolated. As can be appreciated, in alternative embodiments it may be desirable to have the director plate 50 connected to ground.

The first patch 20 includes a first sheet 22 with a slot 24 formed therein. One or more arms 26 are folded and can overlap the top sheet 22. As depicted, the arms 26 are folded under the first sheet 22. A plurality of feeds 28 extend away from the first patch 20 and are configured to be connected to a supporting member (not shown, which could be a PCB or other substrate, as desired).

The first patch 20 is supported by the frame 40 (which can be a first frame). As depicted, the frame 40 includes fingers 48, walls 44 and floor 42 to define a pocket 42*a* that helpz support and retain the first patch 20 in the desired location. A retaining finger 48 can be provided to help secure the first patch 20 in position and a plurality of support blocks 46 can be provided to allow the frame 40 to be mounted on the frame 80.

The second patch 60 includes a second sheet 62 with a slot 64 positioned therein. One or more arms 66 are folded so as to overlap with the second sheet 62 and as depicted are folded under the second sheet 62. A plurality of feeds 68 extend away from the second patch 60 and are configured to be connected to the supporting member.

The frame 80 (which can be a second frame) can be configured to support the frame 40 and may include fingers 88 that can engage the second patch 60, along with walls 86 and a floor 82 that define a pocket 82A to help support the second patch 60. A plurality of support blocks 84 can be used to support the frame 40 on a supporting substrate and, as depicted, can engage the support blocks 46 of the first frame to provide a more robust support structure. The frame 40 and frame 60 are depicted as being configured to engage each other and can be held together in any desirable manner (such as adhesive, press-fitting together, staking of one piece to the other, plastic latches or any other desirable fastener system).

To ensure the stacked patch antenna 10 works effectively, the director plate 50 (which can be formed of any desirable conductive material) can be provided between the first patch 20 and the second patch 60. The director plate 50 helps reflects the energy from/to the antenna 20 and guides the energy from/to the second patch 60. As can be appreciated, therefore, the first patch 20 is on a first side of the director plate 50 and the second patch 60 is on a second side of the director plate 50.

As can be appreciate, the spacing between the director plate 50 and the first patch 20 and the second patch 60 can be modified to control the tuning of the antenna system. In addition, the size of the director plate 50 can also be modified. In an embodiment the director plate 50 can be substantially the same size or larger than the first patch 20. The director plate 50 is also depicted with a passageway 55. The director plate 50 can be separated from the second patch 60 through the use of an adhesive layer (such as a double-sided adhesive tape). It should be noted that director plate 50 could also be positioned above the first frame 40 or even insert molded in the first frame, thus there is considerable flexibility in how the director plate 50 is supported in the desired location.

As can be appreciated from the FIGURES, in certain embodiments it may be desirable for each patch to have four arms folded in a consistent manner so as to provide a more robust and mechanically solid structure. This is not needed, however, if the frame is suitably configured and therefore the shape and arrangement of the arms can be varied as desired for RF performance.

As can be appreciated, the first frame 40 and second frame 80 define a frame system 39. In an embodiment, as will be discussed below, the frame system formed of a single element could be also be used to support both patches. In such an embodiment it is possible that the second patch 60 would be insert molded into the frame system and then the director plate and first patch would be mounted on the frame system. However, a wide range of assembly methods are possible. As can be appreciated, therefore, the depicted embodiments are not intended to be limiting unless otherwise noted.

Figure 8:
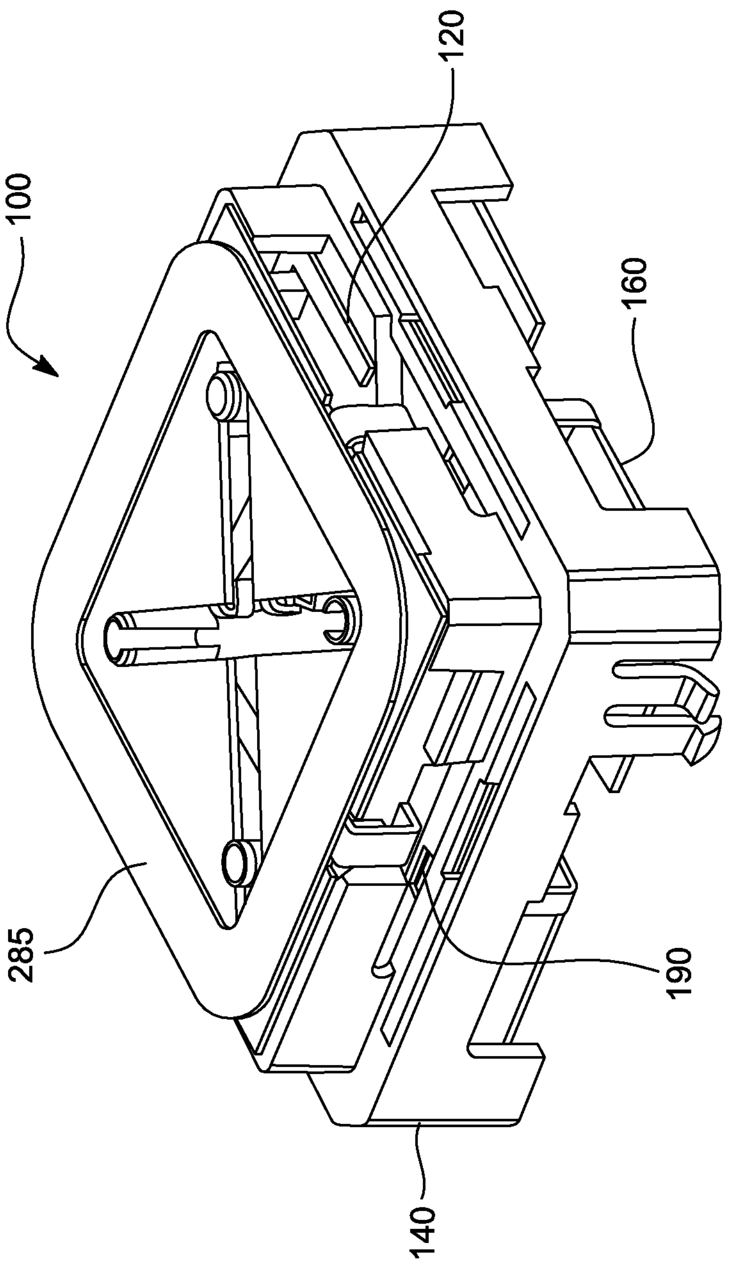
FIG. 8 illustrates a perspective view of an embodiment of a stacked patch antenna.

Turning to FIGS. 8-13, a stacked patch antenna 100 is depicted. In FIG. 8, a first patch 120 and a second patch 160 are supported by frame system 140. As depicted, an optional spacer 285 is depicted on the first patch 120. The spacer 285, if included, can be used to help space the stacked patch antenna 100 from other components and can be a foam-like material to minimize any dielectric impact to the antenna and can also be adhesive to help secure the entire antenna system in place. As can be appreciated, a first director plate 190 is provided between the first patch 120 and the second patch 160 so that each patch is on an opposing side of the first director plate 190. In an embodiment the director plate can be insert molded into the frame system but alternatively may be secured to the frame system via any other desirable such as, without limitation, an adhesive or a friction fit or a snap-in fit.

Figure 9:
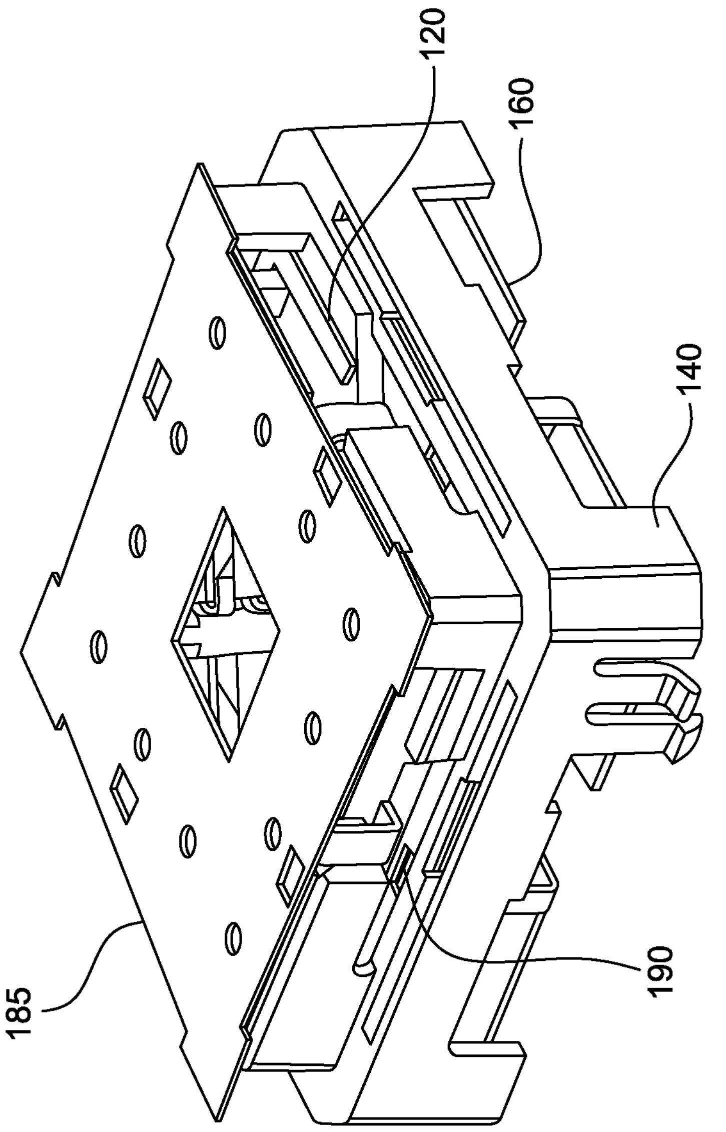
FIG. 9 illustrates a perspective view of the embodiment depicted in FIG. 8 with an additional director plate.
Figure 10:
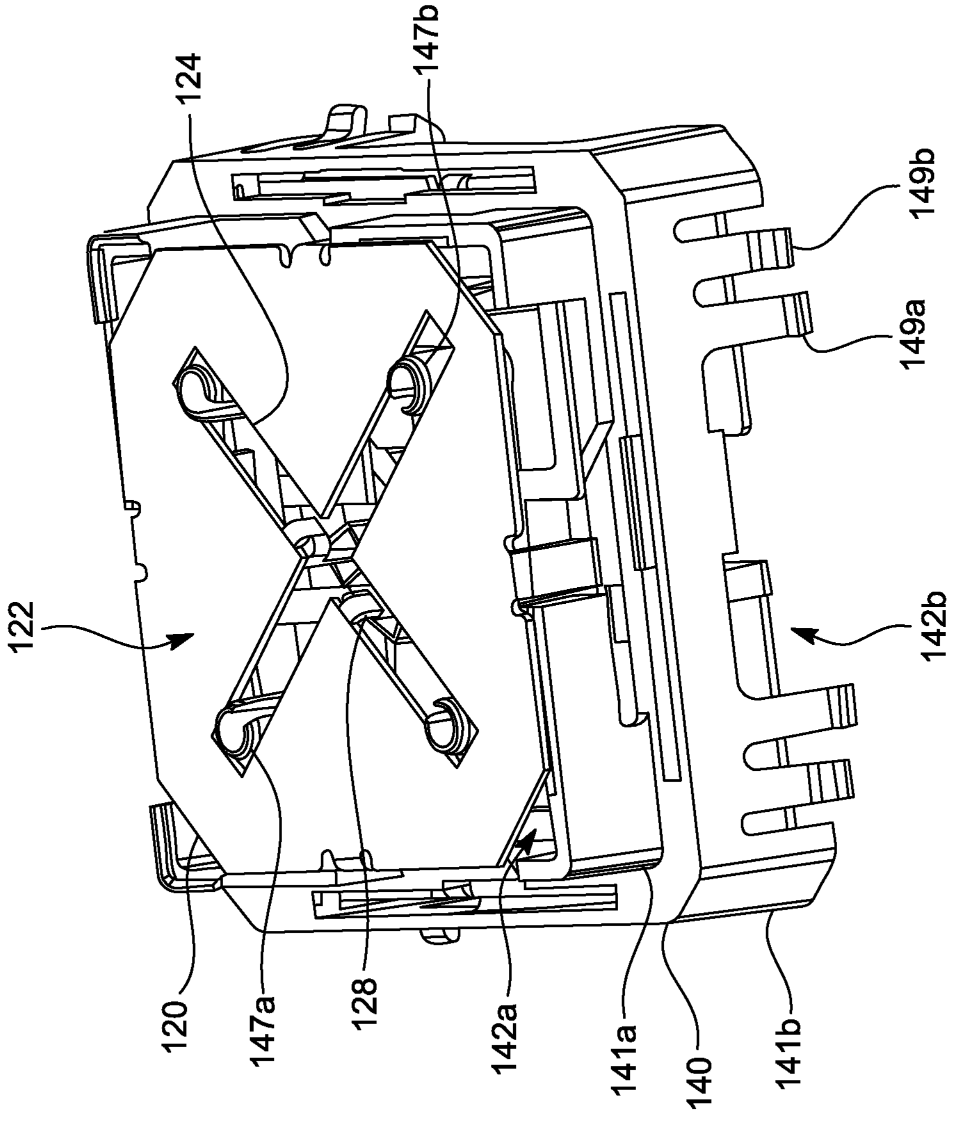
FIG. 10 illustrates a perspective simplified view of the embodiment depicted in FIG. 8.
Figure 11:
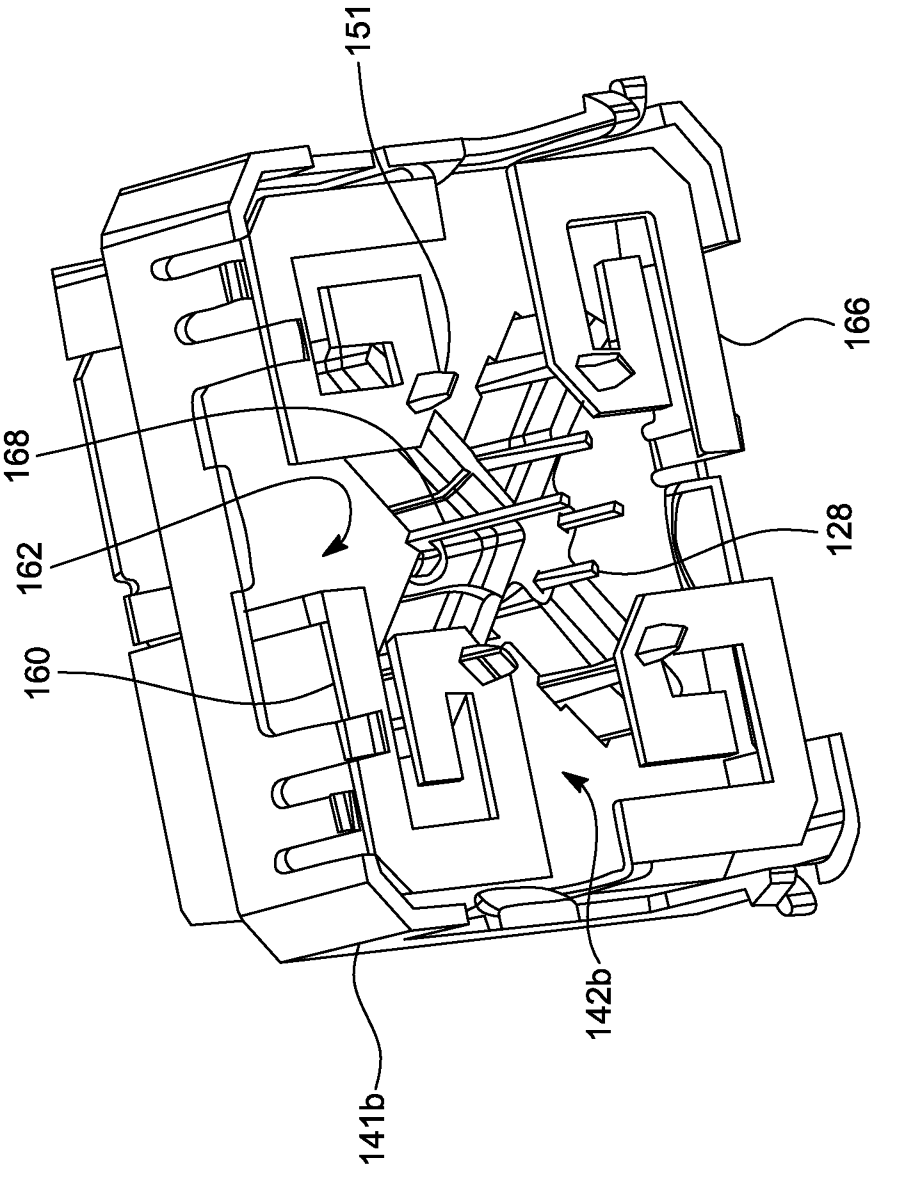
FIG. 11 illustrates another perspective view of the embodiment depicted in FIG. 10.
Figure 12:
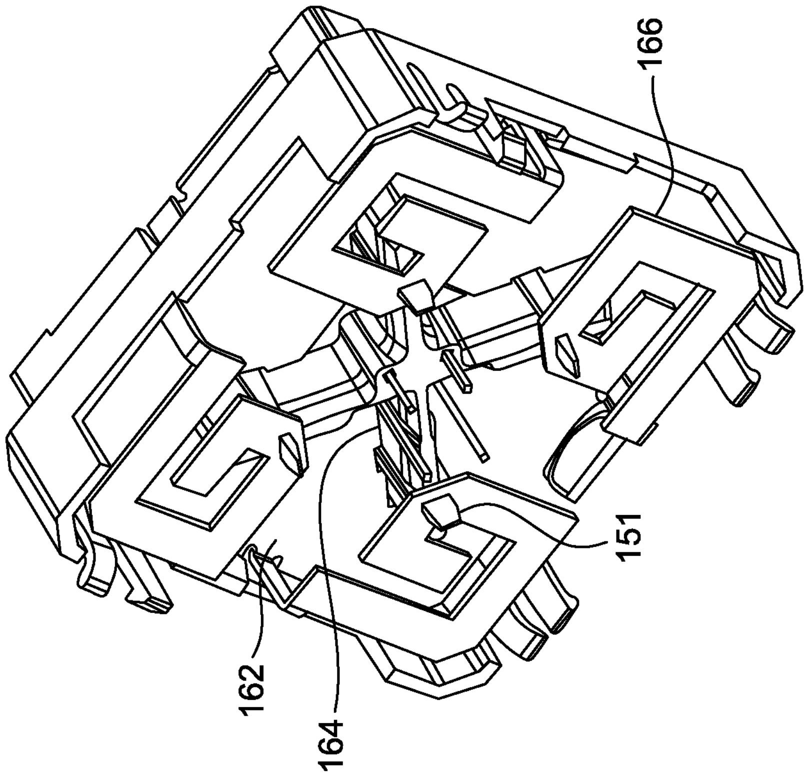
FIG. 12 illustrates another perspective view of the embodiment depicted in FIG. 11.
Figure 13:
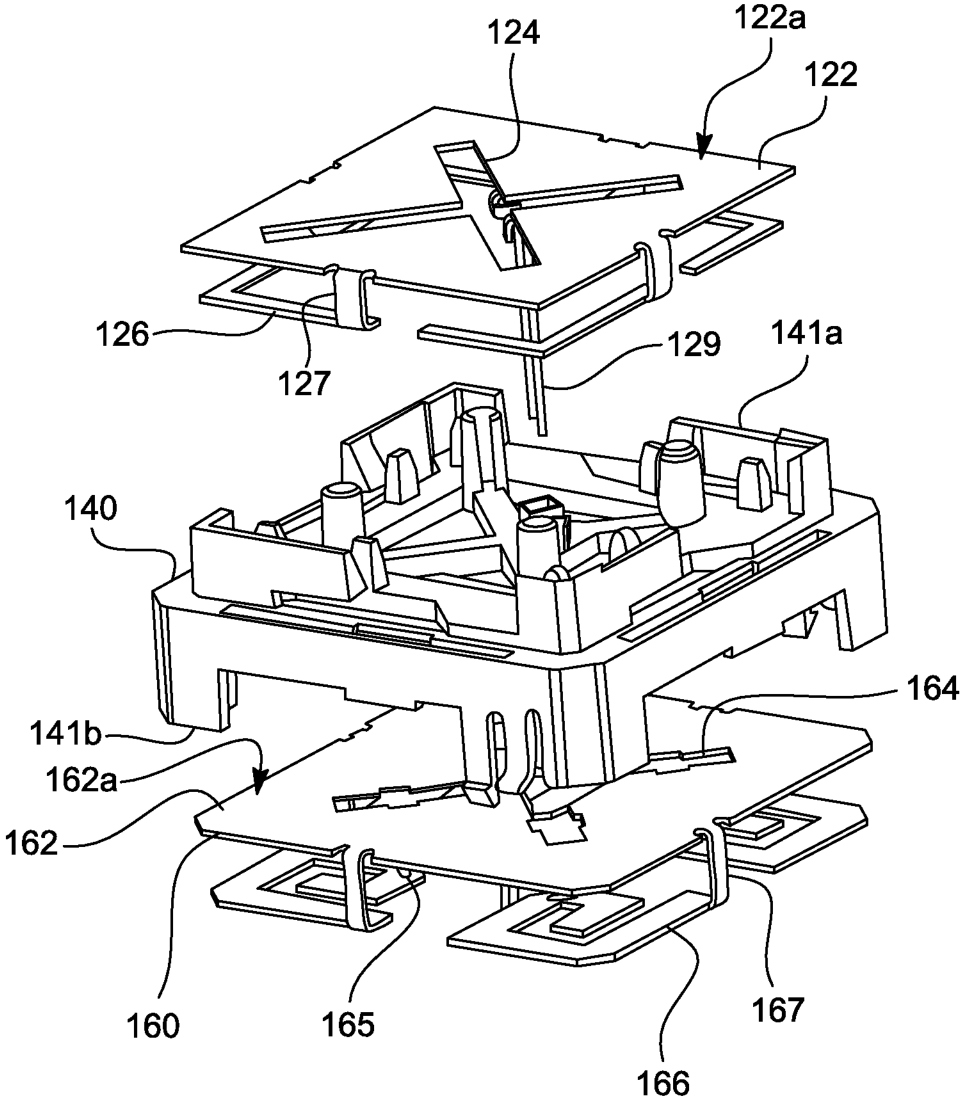
FIG. 13 illustrates an exploded simplified perspective view of the embodiment depicted in FIG. 8.

FIG. 9 illustrates the optional use of a second director plate 185 in addition to the first director plate 190. The second director plate 185 can be slightly spaced from the first patch 120 and is configured so that both patches 120, 160 are on the same side of the second director plate 185. Naturally the position and configuration and number of director plates will vary depending on the configuration of the first patch and the second patch and the desired system performance.

Figure 1:
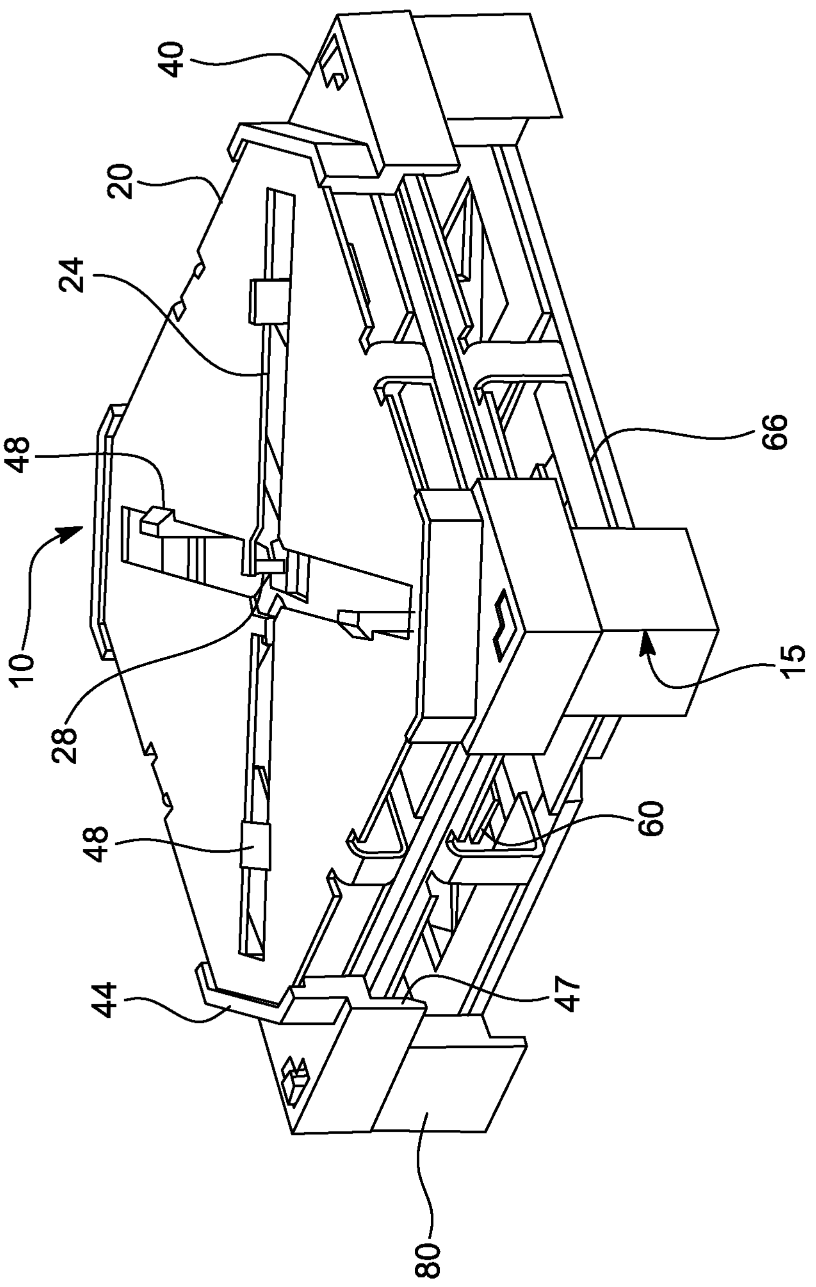
FIG. 1 illustrates a perspective view of an embodiment of a stacked patch antenna.
Figure 2:
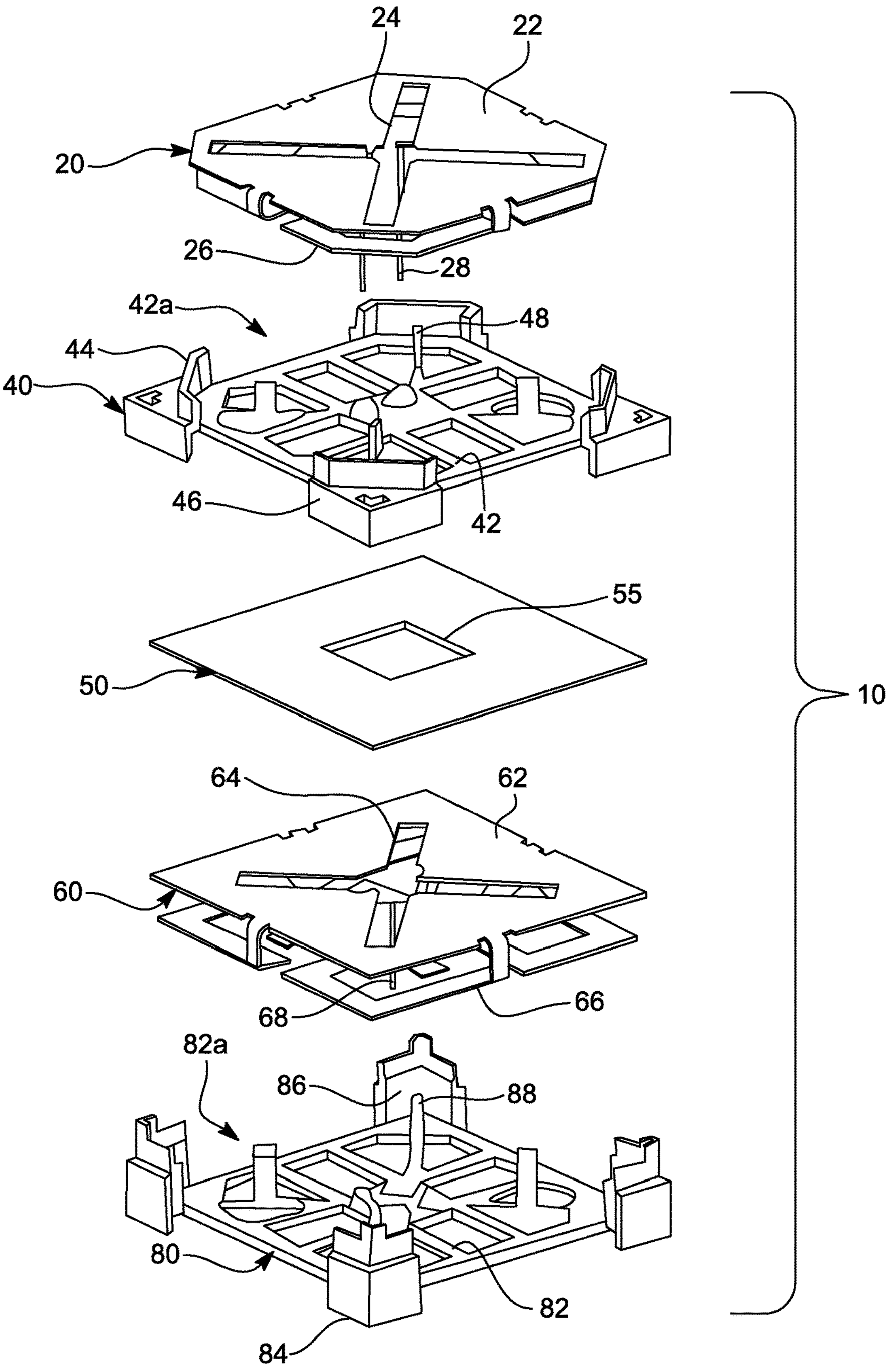
FIG. 2 illustrates an exploded perspective view of the embodiment depicted in FIG. 1.
Figure 3:
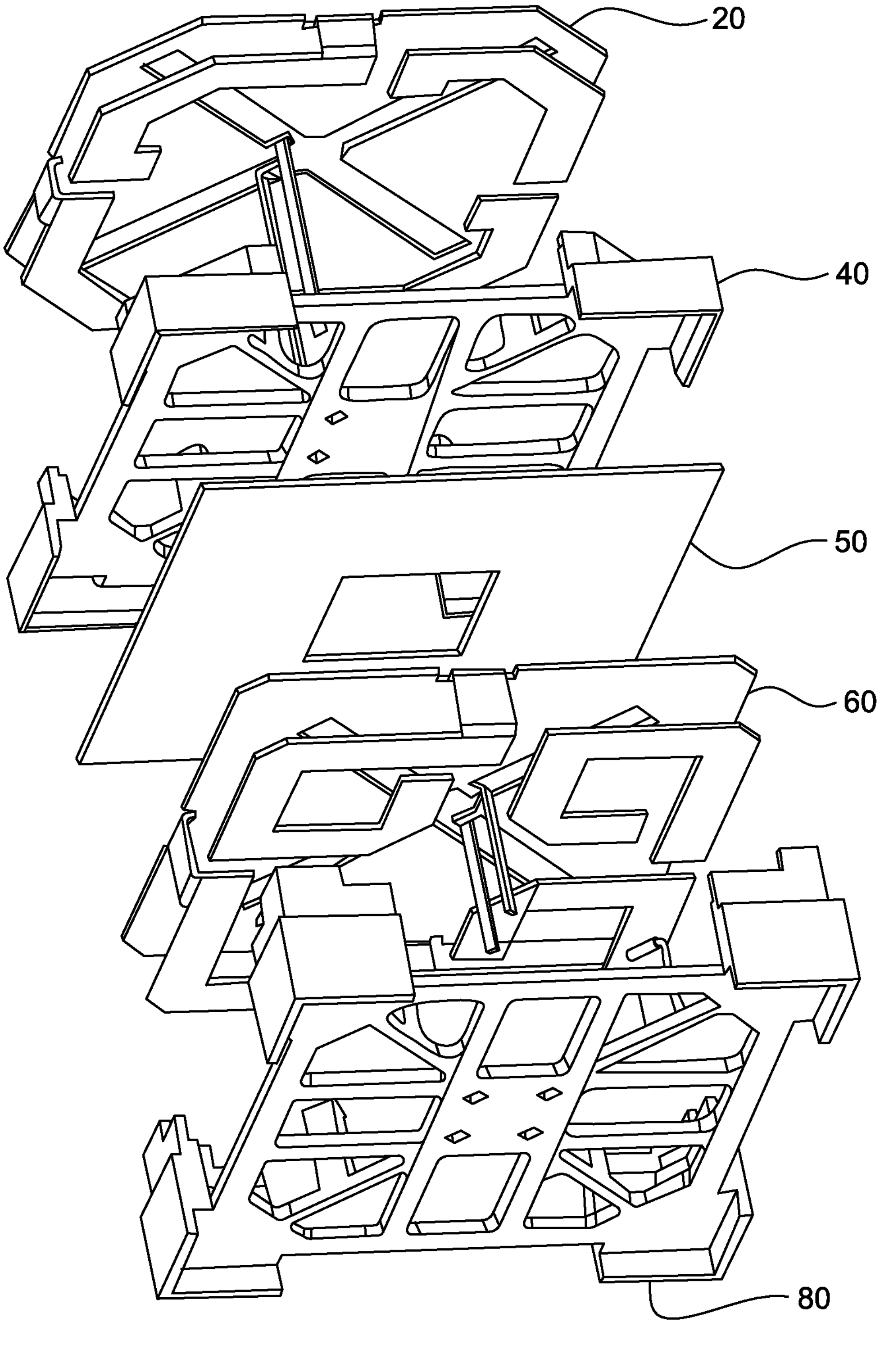
FIG. 3 illustrates a simplified perspective view of the embodiment depicted in FIG. 1.
Figure 4:
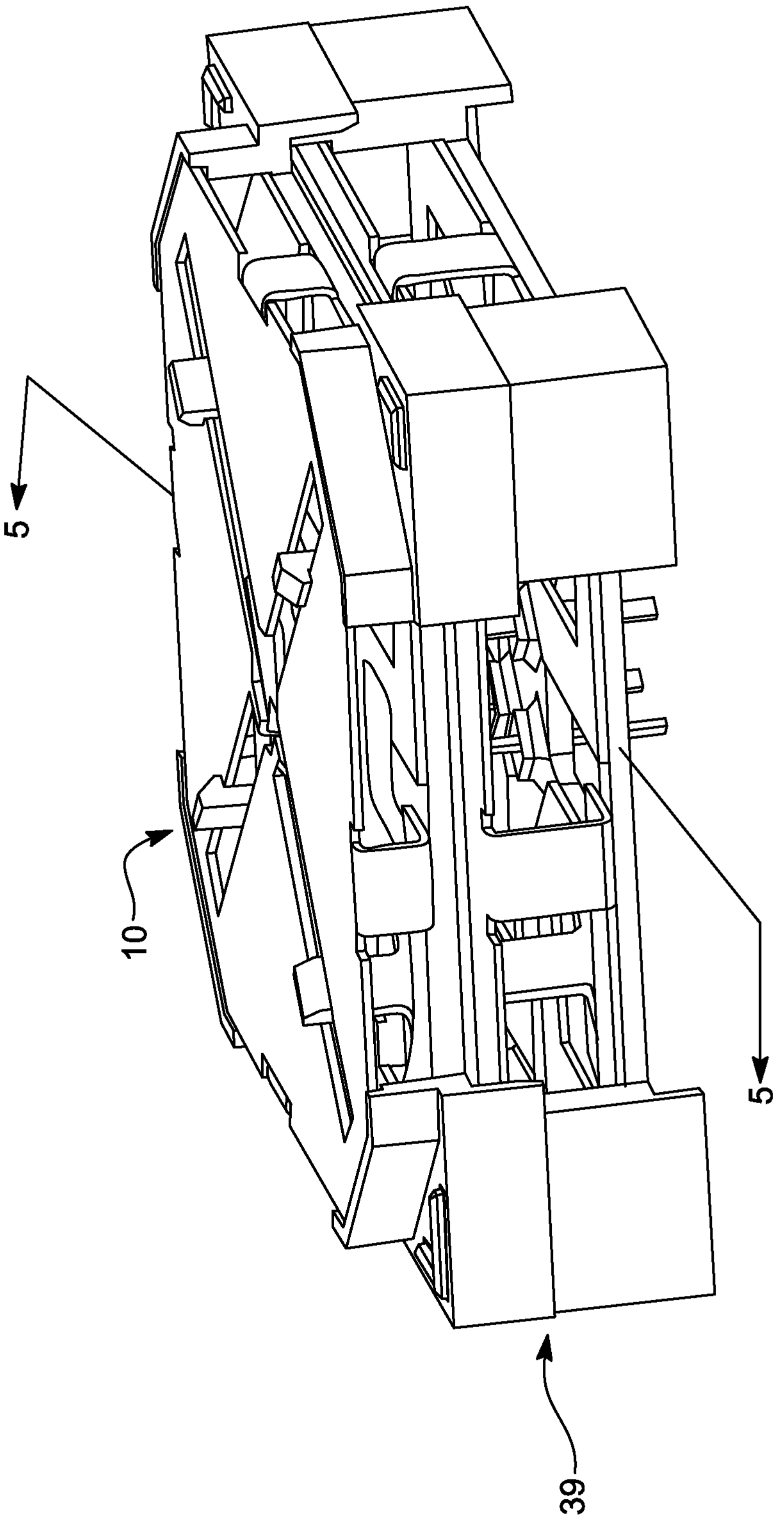
FIG. 4 illustrates a perspective view of an embodiment of a stacked patch antenna.
Figure 5:
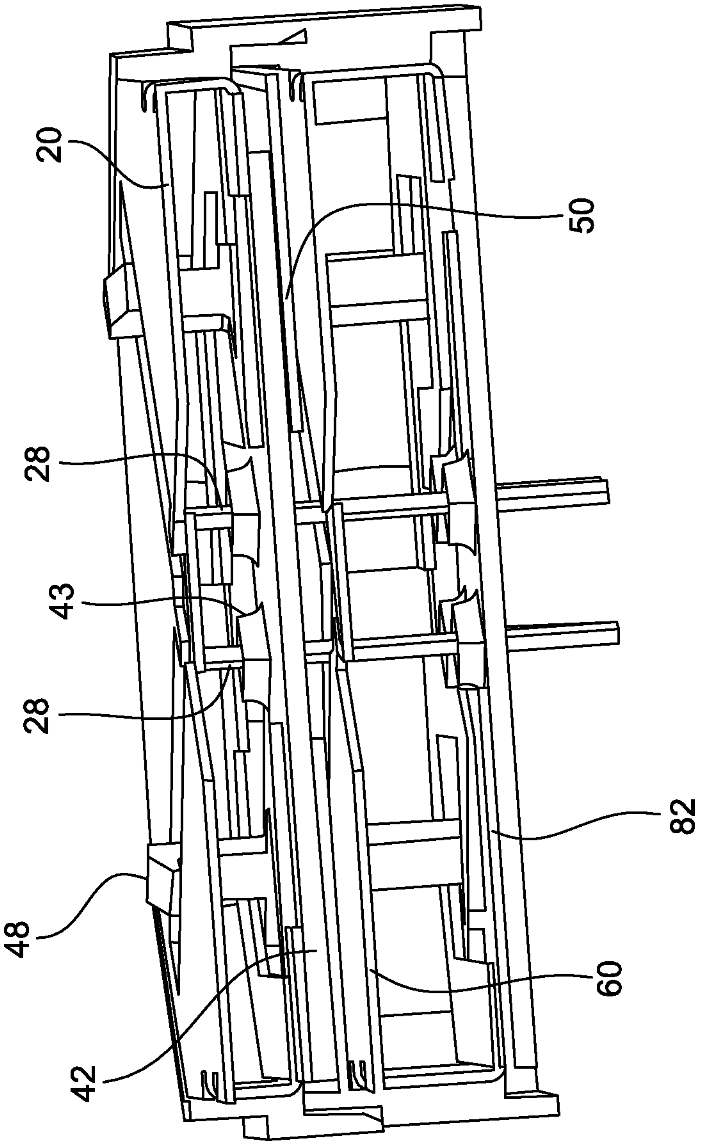
FIG. 5 illustrates a cross-section of the embodiment depicted in FIG. 4, taken along line 5-5.

As can be appreciated, the frame system 140 is depicted as a single integrated element rather than two pieces that formed the frame system depicted in FIG. 1. Naturally, the frame system 140 could also be formed of additional pieces and thus could be formed by 1,2, 3 or more pieces. The depicted frame system 140 includes a first wall 141*a* and a second wall 141*b* that respectively define a first pocket 142*a* and a second pocket 142*b*, similar to the frame system in FIG. 1. As with FIG. 1, the depicted walls are not continuous but instead are configured to be shaped to help control and help maintain the location of the corresponding patch positioned therein and as shown, each wall defines four corners. Naturally some other configuration of the wall that served to constrain the corresponding patch would also be suitable.

The first patch 120 is positioned partially in the first pocket 142*a* and can be aligned and further retained in position with the use of one or more support columns 147*a*. The support column 147*a* The first patch 120 includes a sheet 122 with a slot 124 provided therein where the slot 124 is depicted in the form of an X. As depicted, the sheet 122 is supported by the wall 141*a* and a separate support column 147*a* is positioned in each of the four corners defined by the slot 124. Naturally other configurations of the support columns, if included, can be provided and the support columns 147*a* can have a friction or snap fit with the slot 124. For example, the support column 147*a* can include a shoulder 147*b* that is configured to engage the sheet 122 and help secure the sheet 122 in position. It should be noted that other configurations of slots are also suitable, depending on the arrangement and position of the feeds 128 that are used to drive the first patch 120. As depicted, the feeds 128 are configured to extend from the top plate 122 to a mounting surface (not shown).

As shown, the first patch 120 can include one or more arms 126 that are each connected to the sheet 122 by coupling member 127. In an embodiment the arm(s) can be folded so they are positioned within a perimeter defined by the sheet 122.

Similarly, the second patch 160 is positioned in the second pocket 142*b* and includes a sheet 162 with a slot 164 provided therein. As with the slot 124, the slot 164 can be in the shape of an X but is not so limited. The second patch 160 can include one or more arms 166 that are coupled to the sheet 162 via a coupling member 167 and the arms 166 can be folded so that they are positioned within a perimeter defined by sheet 162. Feeds 168 extend from the sheet 162 and are configured to engage a supporting substrate. As can be appreciated, the first pocket 142*a* and the second pocket 142*b* are on opposing sides of the frame system 140.

As can be appreciated, multiple arms can be included with each patch and the shape and number of arms will depend on the desired performance of the antenna system, as well as the frequencies the patch is intended to work with.

The frame system 140 includes a retaining foot 149*a* and a supporting foot 149*b* that act to help secure the frame system 140 in place on a supporting substrate (not shown). As can be appreciated from FIG. 11, the depicted frame system 140 further includes retaining arms 151 that are configured to engage arms 166 by being inserted into apertures 165 in the arms 166, thus helping to secure the patch 160 in the second pocket 142*b*. As can be further appreciated, the second patch 160 can be configured so that the wall 141*b* extends below/past the second patch 160 and thus the second patch 160 does not need to be positioned directly on the support substrate.

As depicted, the feeds 128 extend from the sheet 122 toward a supporting surface (not shown) in a direction that is substantially perpendicular to the sheet 122. Similarly, the feeds 168 extend from the sheet 162 toward a supporting surface (not shown) in a direction that is substantially perpendicular to the sheet 162.

As can be appreciated, and while not required, in certain embodiments the sheet 122 will define a first plane 122*a* and the sheet 162 will define a second plane 162*a*. The first plane 122*a* and the second plane 162*a* can be substantially parallel to each other (e.g., within 10 degrees) and as depicted, the arms can also be substantially parallel to the respective plate that supports the arms. In such an embodiment the coupling arms can optionally extend away from the top plate in a direction that is substantially perpendicular to the top plate. It should be noted, however, that many other configurations are possible. While the depicted embodiment is believed to be efficient from a space standpoint, other configurations may be more suitable to different performance goals and thus the disclosure is not limited to particular configurations.

With respect to performance, the disclosed design and the basic concept have an advantage over convention stacked patch designs in that they have more air so as to lower the effective dielectric constant of the patches. This results in less loss in the antenna system and can result in a more sensitive antenna system for a given space. The depicted stacked patch design can also provide reduce cost compared to conventional stacked patch antenna systems.

The disclosure provided herein describes features in terms of preferred and exemplary embodiments thereof. Numerous other embodiments, modifications and variations within the scope and spirit of the appended claims will occur to persons of ordinary skill in the art from a review of this disclosure.

We claim:

1. A stacked patch antenna, comprising:

a first patch with a first sheet and a first arm that is folded so as to overlap with the first sheet, the first patch having two feeds;

a second patch with a second sheet and a second arm that is folded so as to overlap with the second sheet, the second patch having two feeds;

a director plate positioned between the first patch and the second patch; and a frame system that supports the first patch, the second patch and the director plate in the desired location.

2. The stacked patch antenna of claim 1, wherein the frame system includes a first frame and a second frame, the first frame supporting the first patch and the second frame supporting the second patch.

3. The stacked patch antenna of claim 2, wherein the director plate is positioned between the second patch and the first frame.

4. The stacked patch antenna of claim 1, wherein the frame system is configured to be mounted on a substrate and the feeds are configured to extend from the respective sheet to the substrate.

5. The stacked patch antenna of claim 1, further comprising a second director plate, wherein the first patch and the second patch are on the same side of the second director plate.

6. A stacked patch antenna, comprising:

a frame system that includes a first pocket and a second pocket, the first pocket and the second pocket being arranged on opposing sides of the frame system;

a first patch with a first sheet, the first patch arranged in the first pocket, the first sheet including a slot provided therein and coupled to a first feed;

a second patch with a second sheet, the second patch arranged in the second pocket, the second sheet including a slot provided therein and coupled to a second feed; and a director plate located between the first and second patch.

7. The stacked patch antenna of claim 6, wherein the first pocket is defined by a first wall.

8. The stacked patch antenna of claim 7, wherein the first sheet is positioned so that it is supported by the first wall.

9. The stacked patch antenna of claim 8, wherein the frame system includes a support column and the support column is positioned in the slot.

10. The stacked patch antenna of claim 9, wherein the support column includes a shoulder that helps retain the first sheet in position.

11. The stacked patch antenna of claim 6, further including a second director plate positioned such that the first patch is between the first director plate and the second director plate.

12. The stacked patch antenna of claim 6, wherein the further frame system includes a retaining foot configured to secure the frame system to a substrate.

13. The stacked patch antenna of claim 6, wherein the frame system includes a retaining arm in the second pocket and the second patch is supported by the retaining arm.

14. The stacked patch antenna of claim 13, wherein the second patch includes an arm and the retaining arm extend through an aperture in the arm.

15. A stacked patch antenna for mounting on a substrate, comprising:

a frame system;

a director plate supported by the frame system;

a first patch with a first sheet, the first patch supported by the frame system on a first side of the director plate, the first sheet including a slot provided therein and a first arm that connected to the first sheet, the first patch including a first feed that extends from the first sheet and extends toward the substrate; and a second patch with a second sheet, the second patch supported by the frame system on a second side of the director plate, the second sheet including a slot provided therein and a second arm that connected to the second sheet, the second patch including a second feed that extends from the second sheet and extends toward the substrate.

16. The stacked patch antenna of claim 15, wherein the frame system includes a first pocket and the first patch is positioned in the first pocket.

17. The stacked patch antenna of claim 16, wherein the first pocket includes a wall and the first sheet is positioned on the first wall.

18. The stacked patch antenna of claim 15, wherein the frame system is a single integrated structure.

19. The stacked patch antenna of claim 15, wherein the first arm of the first patch and the second arm of the second patch are each folded under the first sheet and the second sheet, respectively.

20. The stacked patch antenna of claim 19, wherein the first sheet defines a first perimeter and the first arm is arranged within the first perimeter.

* * * * *